US008687049B2

(12) United States Patent
Hong

(10) Patent No.: US 8,687,049 B2
(45) Date of Patent: Apr. 1, 2014

(54) DISPLAY DEVICE AND METHOD OF DISPLAYING IMAGE

(75) Inventor: Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1451 days.

(21) Appl. No.: 11/642,873

(22) Filed: Dec. 21, 2006

(65) Prior Publication Data

US 2007/0296808 A1 Dec. 27, 2007

(30) Foreign Application Priority Data

Jun. 20, 2006 (KR) ........................ 10-2006-0055618

(51) Int. Cl.
*H04N 13/04* (2006.01)
(52) U.S. Cl.
USPC .................................. 348/51; 353/7; 359/619
(58) Field of Classification Search
USPC ..................... 348/51, 55; 353/7; 359/290, 619
See application file for complete search history.

(56) References Cited

U.S. PATENT DOCUMENTS

| 5,831,765 A | 11/1998 | Nakayama et al. |
| 6,433,930 B1 * | 8/2002 | Son ................................. 348/51 |
| 2002/0126389 A1 * | 9/2002 | Moseley et al. .............. 359/619 |
| 2004/0057016 A1 * | 3/2004 | Jones .................................. 353/7 |
| 2005/0156814 A1 * | 7/2005 | Sato et al. ....................... 345/1.3 |
| 2009/0116108 A1 * | 5/2009 | Levecq et al. ................. 359/463 |

FOREIGN PATENT DOCUMENTS

| GB | 2399653 A | 9/2004 |
| JP | 2004-287440 A | 10/2004 |
| JP | 2005-99787 A | 4/2005 |
| JP | 200599787 A | 4/2005 |
| WO | 01/59749 A1 | 8/2001 |
| WO | 2001-59749 A1 | 8/2001 |

OTHER PUBLICATIONS

J. Eichenlaub, "A Lightweight, Compact, 2D/3D Autostereoscopic LCD Backlight for Games, Monitor, and Notebook Applications," SPIE vol. 3012, pp. 274-281.
Office Action issued Sep. 28, 2009 in corresponding Japanese Application No. 2006-351338.
KIPO—Korean Patent Application No. 10-2006-0055618—Office Action dated Aug. 27, 2012.

* cited by examiner

*Primary Examiner* — Moustafa M Meky
*Assistant Examiner* — Clayton R Williams
(74) *Attorney, Agent, or Firm* — Morgan, Lewis & Bockius LLP

(57) ABSTRACT

A display device includes a display panel for displaying a plurality of images, a viewing-zone generator for producing a plurality of viewing zones corresponding to the plurality of images and a first reflector at a first side of the display panel for reflecting a first image of the plurality of images to one of the plurality of viewing zones that corresponds to a second image of the plurality of images.

12 Claims, 9 Drawing Sheets

DISPLAY DEVICE AND METHOD OF DISPLAYING IMAGE

This application claims the benefit of Korean Patent Application No. 10-2006-0055618, filed in Korea on Jun. 20, 2006, which is hereby incorporated by reference in its entirety.

BACKGROUND OF THE INVENTION

1. Field of the Invention

Embodiments of the invention relate to a display device and a method of displaying an image.

2. Discussion of the Related Art

In general, a display device includes a display panel displaying an image and a driving circuit operating the display panel. The display panel has a plurality of pixels arranged in a matrix shape. A plurality of unit images produced by the plurality of pixels collectively display an image on the display device.

A viewing angle of the display device is measured with reference to a perpendicular line to the display panel. When a user views the display device beyond a specific viewing angle, an undesired abnormal image may be displayed. A display device has been suggested in which barriers are placed between a user and the display panel such that certain pixels can only be seen between the barriers depending on the viewing angle. In this type display device, displayed images are different according to viewing angles such that viewing zones are produced according to the different viewing angles. In other words, different pixels produce different viewing zones, and thus different images can be displayed in different viewing zones.

Such a barrier type display device can be used for a three-dimensional display device. The three-dimensional display device uses a principle of a stereo vision through both eyes. In other words, a parallax distance of both eyes, such as 65 mm, acts as a primary factor in the display of three-dimensional images. When the right and left eyes look at two respective two-dimensional images, the two two-dimensional images are transferred to the brain and then the brain mixes the two two-dimensional images so as to perceive them to be a three-dimensional image. Thus, realistic three-dimensional image having depth appears to be displayed.

Based upon the above principle of stereo vision through both eyes, a three-dimensional display device can be either a stereoscopic display device with glasses, a stereoscopic display device without glasses, or a holographic display device. The stereoscopic display device with glasses has disadvantages, such as inconvenience of wearing glasses and unnaturalness look due to viewing the display through glasses. The holographic display device has a difficulty in that large equipment is necessary for using a laser reference beam of display the image. However, the stereoscopic display device without glasses does not require glasses and has small equipment. The stereoscopic display devices without glasses are divided into a parallax barrier type, a lenticular type and an integral photography type. Of these types, presently, the parallax barrier type and the lenticular type have been typically used.

FIG. 1 is a view illustrating operation of a parallax barrier type display device according to the related art. Referring to FIG. 1, the parallax barrier type display device 10 includes a display panel 20 simultaneously displaying a left-eye image and a right-eye image, and a parallax barrier 30. A left-eye pixel L and a right-eye pixel R are alternately arranged in the display panel 20. The parallax barrier 30 is disposed between the display panel 20 and a user 40. The parallax barrier 30 has a slit 32 and a barrier 34 by which light emitted from the left-eye and right-eye pixels L and R selectively passes through the parallax barrier 30. The slit 32 and the barrier 34 are alternately arranged in a vertical direction with respect to the user 40.

A left-eye image $I_L$ produced by the left-eye pixel L passes through the slit 32 and reaches a left eye of the user 40, and a right-eye image $I_R$ produced by the right-eye pixel R passes through the slit 32 and reaches a right eye of the user 40. The left-eye and right-eye images $I_L$ and $I_R$ see separate images in parallax, and the user 40 combines the two images to perceive a three-dimensional image.

A width P of each of the left-eye and right-eye pixels L to R, a width P1 of the slit 32, a width P2 of the barrier 34, and an interval E, such as 65 mm, between the left and right eyes are expressed as the following relation expression.

$$P1+P2=2/(1/E+1/P) \quad \{1\}$$

By adjusting the width P of the left-eye and right-eye pixels L to R, the width P1 of the slit 32 and the width P2 of the barrier 34 in consideration of the interval E between the left and right eyes, the display device 10 can display a desired three-dimensional image.

FIG. 2 is a view illustrating operation of a lenticular type display device according to the related art. Referring to FIG. 2, the lenticular type display device 15 includes a display panel 20 simultaneously displaying a left-eye image and a right-eye image, and a lenticular array 50. A left-eye pixel L and a right-eye pixel R are alternately arranged in the display panel 20. The lenticular array 50 is disposed between the display panel 20 and a user 40. The lenticular array 50 has lenticular lens 52 by which lights emitted from the left-eye and right-eye pixels L and R selectively are refracted. The lenticular lens 52 has a semi-cylindrical shape in a vertical direction with respect to the user 40.

A left-eye image $I_L$ produced by the left-eye pixel L is refracted by the lenticular lens 52 and reaches a left eye of the user 40, and a right-eye image $I_R$ produced by the right-eye pixel R is refracted by the lenticular lens 52 and reaches a right eye of the user 40. The left-eye and right-eye images $I_L$ and $I_R$ include separate images considering a parallax, and the user 40 combines the two images to perceive a three-dimensional image. By adjusting a width P of the left-eye and right-eye pixels L to R and a width and a spherical surface radius of the lenticular lens 52 in consideration of the interval E between the left and right eyes, the display device 15 can display the three-dimensional image desired.

Users desire to see large images. As explained above, the related art parallax barrier type or lenticular type display device produce two viewing zones using the parallax barrier or the lenticular array to display a perceived three-dimensional image. However, size of the image displayed in these types of devices is limited to the size of the display panel.

SUMMARY OF THE INVENTION

Accordingly, embodiments of the invention are directed to a display device and a method of displaying an image that substantially obviates one or more of problems due to limitations and disadvantages of the related art.

An object of the invention is to provide a display device and a driving method thereof that have a high performance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, according to an aspect of the invention, there is provided a display device including a display panel for displaying a plurality of images, a viewing-zone generator for producing a plurality of viewing zones corresponding to the plurality of images, and a first reflector at a first side of the display panel for reflecting a first image of the plurality of images to one of the plurality of viewing zones that corresponds to a second image of the plurality of images.

In another aspect of the invention, a method of displaying an image includes dividing a single image into a plurality of partial images, displaying the plurality of partial images on corresponding sets of pixels arranged alternately throughout a first area of the display panel; and reflecting a first partial image of the plurality of partial images such that a single image is seen having a second area larger than a first area of the display panel.

In yet another aspect of the invention, a display device includes a display panel for displaying a plurality of images on corresponding sets of pixels arranged alternately throughout a first area of the display panel, a viewing-zone generator for producing a plurality of viewing zones corresponding to the plurality of images, respectively, and a first reflector at a first side of the display panel for reflecting a first image of the plurality of partial images such that a single image is seen having a second area larger than a first area of the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 1:
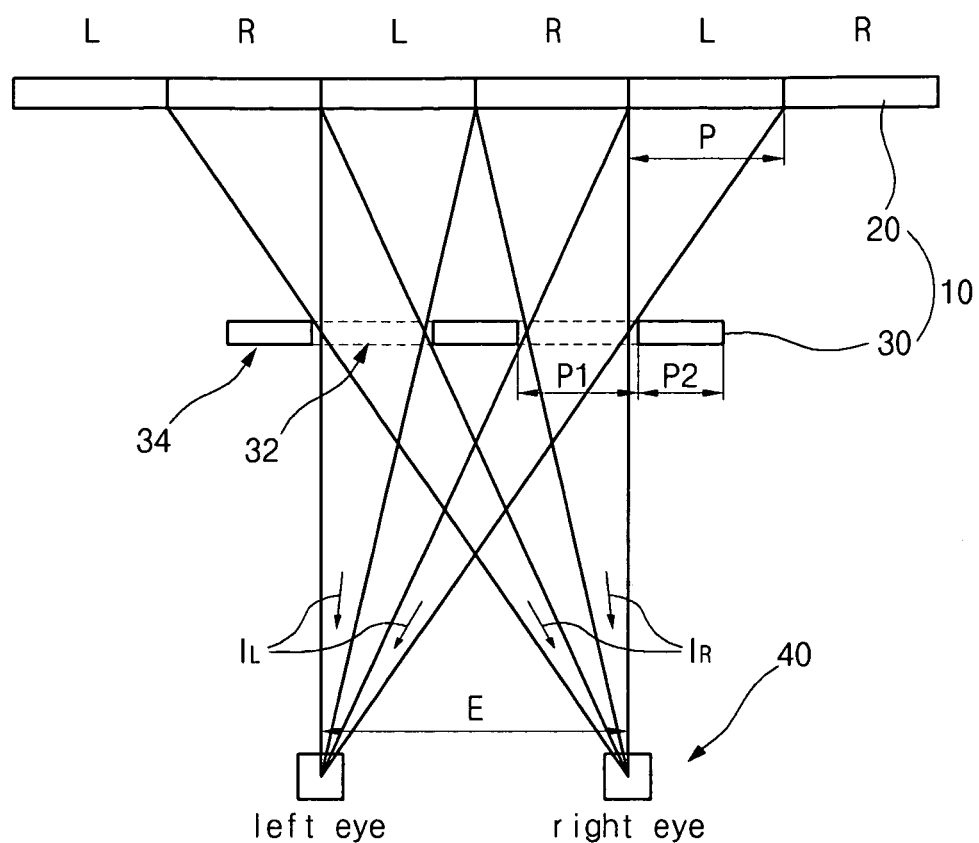
FIG. 1 is a view illustrating operation of a parallax barrier type display device according to the related art.
Figure 2:
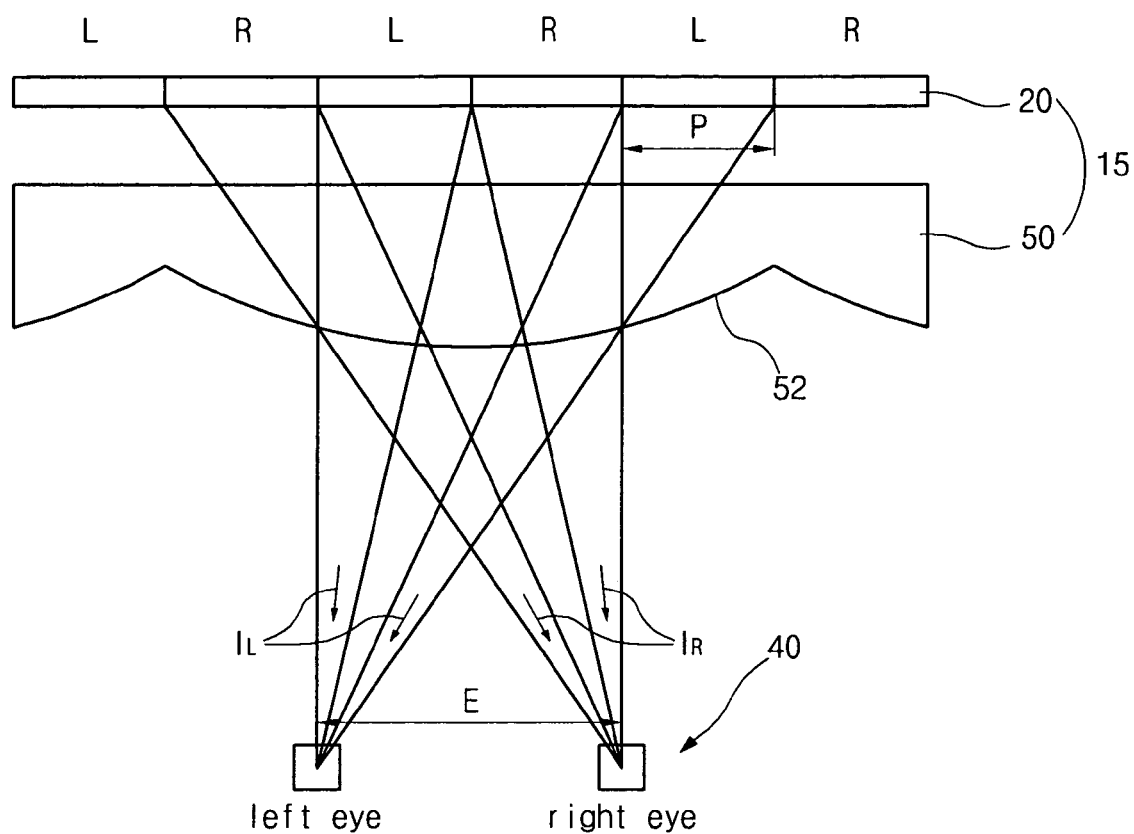
FIG. 2 is a view illustrating operation of a lenticular type display device according to the related art.
Figure 3:
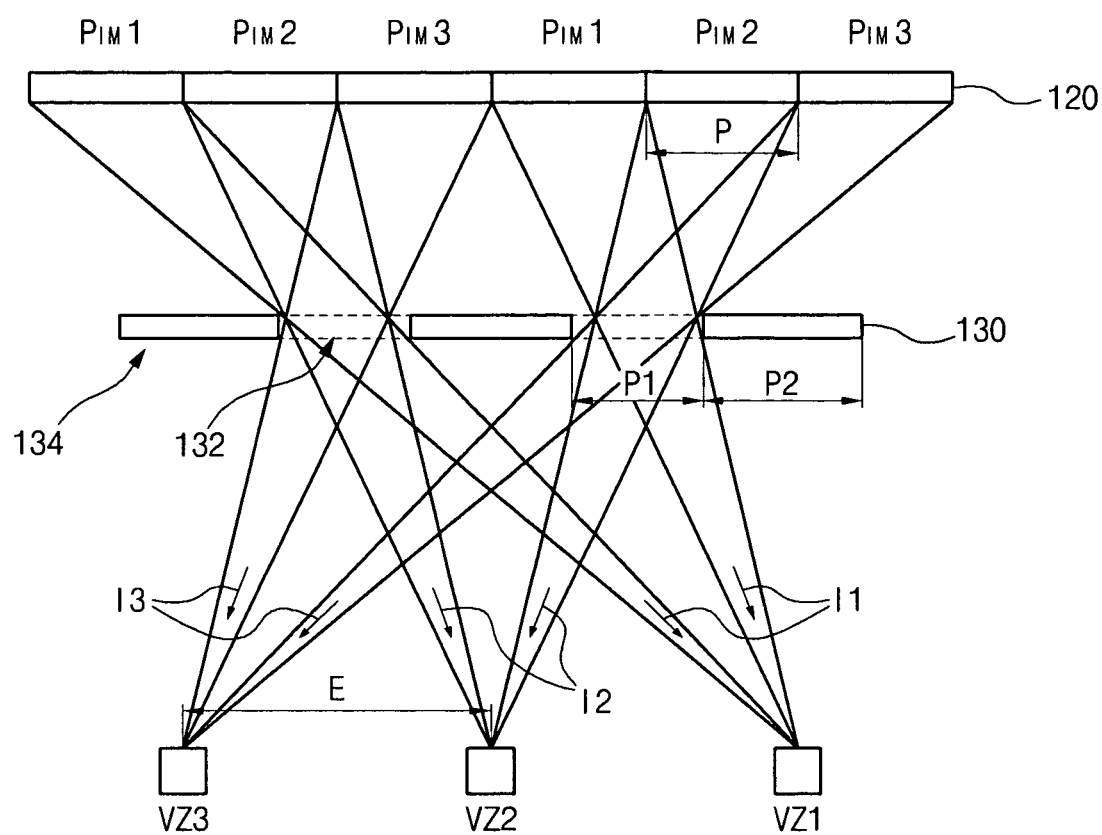
FIG. 3 is a view illustrating operation of a display panel and a viewing-zone generator of a display device according to a first exemplary embodiment of the invention.

FIG. 3 is a view illustrating operation of a display panel and a viewing-zone generator of a display device according to a first exemplary embodiment of the invention. Referring to FIG. 3, the display device according to the first exemplary embodiment of the invention includes a display panel 120 and a viewing-zone generator 130. The display panel 120 includes first, second and third pixels PIM1, PIM2 and PIM3 arranged alternately. The first, second and third pixels PIM1, PIM2 and PIM3 simultaneously display first, second and third images I1, I2 and I3. The viewing-zone generator 130 can be disposed in front of the display panel 120 and produce first, second and third viewing zones VZ1, VZ2 and VZ3 at different viewing angles. The viewing-zone generator 130 can include a parallax barrier.

The first to third images I1, I2 and I3 can be partial images in which a single image is divided into multiple images. For example, the single image is divided into three partial images, a left partial image, a center partial image and a right partial image. The left partial image is assigned to the third image I3, the center partial image is assigned to the second image I2, and the right partial image is assigned to the first image I1.

The parallax barrier includes a slit 132 and a barrier 134 arranged alternately. This alternated arrangement of the slit 132 and the barrier 134 makes light emitted from the first to third pixels PIM1, PIM2 and PIM3 selectively pass through the parallax barrier. The slit 132 and the barrier 134 have a stripe shape in a vertical direction with respect to a user viewing the display device. The first image I1 displayed by the first pixel PIM1 passes through the slit 132 and reaches a first viewing zone VZ1. The second image I2 displayed by the first pixel PIM2 passes through the slit 132 and reaches a second viewing zone VZ2. The third image I3 displayed by the first pixel PIM3 passes through the slit 132 and reaches a third viewing zone VZ3.

A width P of each of the first to third pixels PIM1 to PIM3, a width P1 of the slit 132, a width P2 of the barrier 134, and an interval E between the first to third viewing zones VZ1 to VZ3 are expressed as a following relation expression.

$$P1+P2=3/(1/E+1/P) \quad \{2\}$$

By adjusting the width P of each of the first to third pixels PIM1 to PIM3, the width P1 of the slit 132, the width P2 of the barrier 134, and the interval E between the first to third viewing zones VZ1 to VZ3 with the above relation expression, the display panel 120 and the viewing-zone generator 130 display a desired images in multiple viewing zones. As described above, the display device according to the first exemplary embodiment can produce the first to third viewing zones where the first to third images each have different viewing angles.

Figure 4:
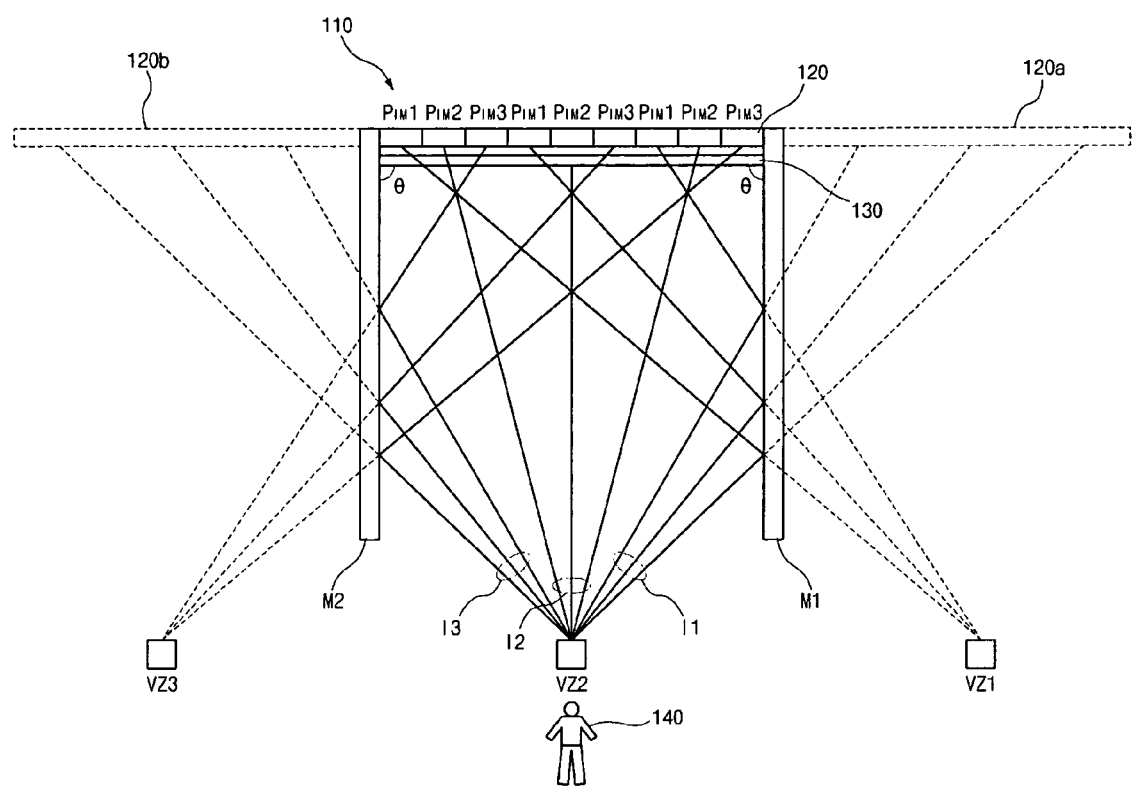
FIG. 4 is a view illustrating operation of a display device according to the first exemplary embodiment of the invention.

FIG. 4 is a view illustrating an operation of a display device according to the first exemplary embodiment of the invention. Referring to FIG. 4, the display device 110 includes a display panel 120, a viewing-zone generator 130 and first and second reflectors M1 and M2. The display panel 120 includes first to third pixels PIM1, PIM2 and PIM3 producing first to third images I1, I2 and I3, respectively, and arranged alternately. The viewing-zone generator 130 is disposed in front of the display panel 120. A parallax barrier can be used for the viewing-zone generator 130. Accordingly, the display panel 120 and the viewing-zone generator 130 produce first to third viewing zones VZ1, VZ2 and VZ3 having the first to third images I1, I2 and I3, respectively, as described in FIG. 3.

The first and second reflectors M1 and M2 are arranged at both sides of the display panel 120. The first and second reflectors M1 and M2 can have an angle θ with respect to a front surface of the display panel 120. The angle θ can be between about 80 to about 100 degrees, such as 90 degrees. The first and second reflectors M1 and M2 are made of a material having a high reflectance, such as a mirror.

Among images produced by the display panel 120, the second image I2 goes straight into the second viewing zone VZ2 without reflection. The first and third images I1 and I3 do not reach the first and third viewing zones VZ1 and VZ3, respectively. Instead, the first and third images I1 and I3 are reflected by the first and second reflectors M1 and M2, respectively, and are directed toward the second viewing zone VZ2.

As a result of the first and third images I1 and I3 being respectively reflected by the first and second reflectors M1 and M2, a user 140 located at the second viewing zone VZ2 can see all of the first to third images I1 to I3. Thus, the user 140 perceives the first image I1 reflecting on the first reflector M1 being produced by a first virtual display panel 120*a*, which is disposed along a right extension line from the display panel 120. Further, the user 140 also perceives the third image I3 reflecting on the second reflector M2 being produced by a second virtual display panel 120*b*, which is disposed along a left extension line from the display panel 120. The first and second virtual display panels 120*a* and 120*b* can have substantially the same width as the display panel 120. As a result, the user 140 perceives the first virtual display panel 120*a*, the display panel 120 and the second virtual display panel 120*b* respectively displaying the first, second and third images I1, I2 and I3.

The first to third images I1 to I3 can correspond to three partial images of a single image that has been divided into multiple images, as described in FIG. 3. For example, a single image is divided into three partial images, such as a left partial image, a center partial image and a right partial image. The left partial image is assigned as the third image I3, the center partial image is assigned as the second image I2, and the right partial image is assigned as the first image I1. The user 140 combines the first to third images I1 to I3 so as to perceive them as the single image. In other words, because the first and third images I1 and I3 correspond to the right and left partial images and the second image I2 corresponds to the center partial image, the user 140 perceives the single image being displayed by an extension panel having the display panel 120 and the first and second virtual display panels 120*a* and 120*b*. Because the first and second virtual display panels 120*a* and 120*b* have substantially the same width as the display panel 120, the displayed single image is three times wider than the display panel 120. Accordingly, the user 140 can see a three times enlarged image in the horizontal direction. In other words, the display area has been increased threefold.

Figure 5:
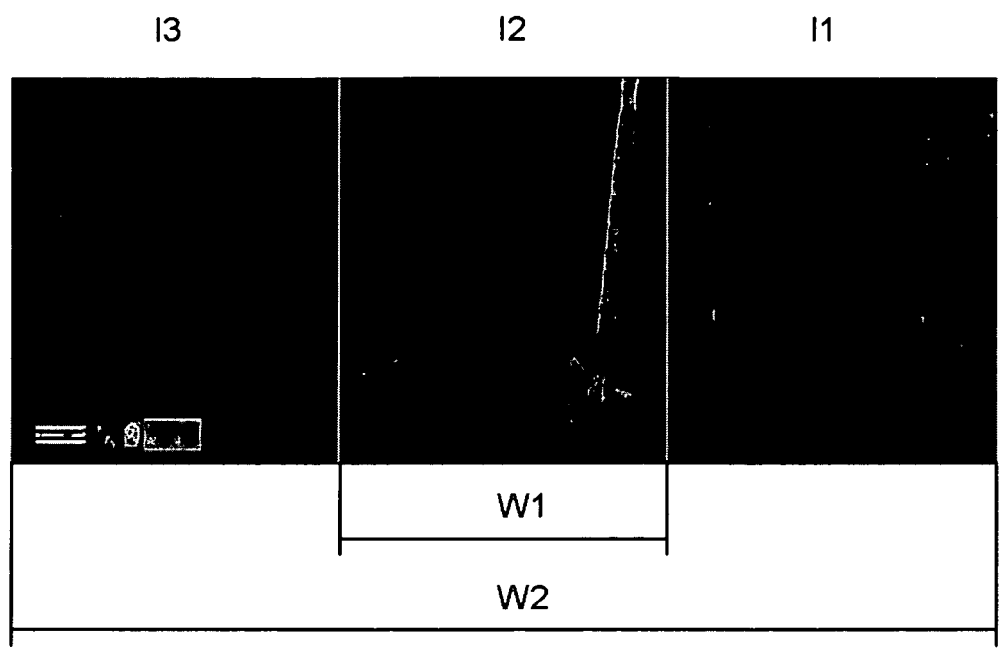
FIG. 5 is a picture displayed in view of a user of the display device according to the exemplary embodiment.

FIG. 5 is a picture displayed in view of a user of the display device according to the first exemplary embodiment. Referring to FIG. 5, the user combines first to third images I1 to I3 to perceive them as a single image. When the display panel (120 of FIG. 4) has a first width W1, the perceived single image has a second width W2, which is substantially three times wider than the first width W1 such that the user sees about three times more display area. Accordingly, the display device according to the first exemplary embodiment can display an image larger than the display panel by using the display panel, the viewing-zone generator and the first and second reflectors.

The display device according to the first exemplary embodiment can alternatively use a lenticular array in the viewing-zone generator. Even when the lenticular array is used, the first and second reflectors are arranged such that three different viewing zones are produced similar to when a parallax barrier is used. Accordingly, two images are displayed in the two viewing zones reflected from the first and second reflectors to another viewing zone where a user is also seeing another image such that the user perceives the three images as a single image.

Figure 6:
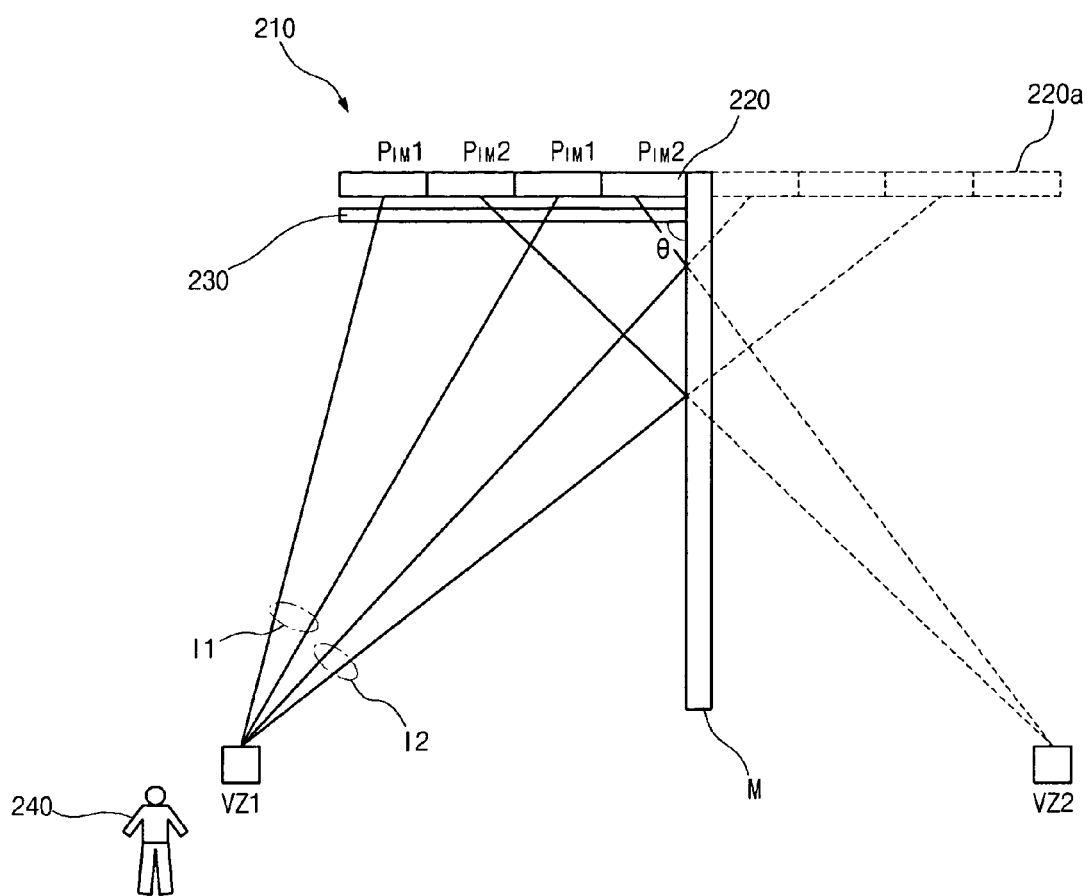
FIG. 6 is a view illustrating operation of a display device according to a second exemplary embodiment of the invention.

FIG. 6 is a view illustrating operation of a display device according to a second exemplary embodiment of the invention. Referring to FIG. 6, the display device 210 includes a display panel 220, a viewing-zone generator 230, including a parallax barrier and a lenticular array, and a reflector M. The display panel 220 includes first and second pixels PIM1 and PIM2 producing first and second images I1 and I2, respectively, and arranged alternately. The viewing-zone generator 230 is disposed in front of the display panel 220. The viewing-zone generator 230 includes a parallax barrier and a lenticular array. Accordingly, the display panel 220 and the viewing-zone generator 230 produce first and second viewing zones VZ1 and VZ2 for the first and second images I1 and I2, respectively.

The reflector M can be arranged at one side of the display panel 220, for example, a right side. The reflector M can have an angle θ with respect to a front surface of the display panel 220. The angle θ can be between about 80 and about 100 degrees, such as 90 degrees. The reflector M is made of a material having a high reflectance, such as a mirror.

Among images produced by the display panel 220, the first image I1 goes straight toward the first viewing zone VZ1 without reflection. The second image I2 does not reach the second viewing zone VZ2. Instead, the second image I2 is reflected by the reflector M toward the first viewing zone VZ1.

As shown in FIG. 6, a user 240 has an off-angle viewing angle to the display panel 220. In other words, the user 240 does not have to be directly in front of the display panel 220. Instead, the user can be positioned to the side of the display panel 220.

As a result, a user 240 located at the first viewing zone VZ1 can see all of the first and second images I1 and I2. The user 240 sees the second image I2 reflected on the reflector M being produced by a virtual display panel 220*a*, which is disposed along a right extension line from the display panel 220. The virtual display panel 220 can substantially have the same width as the display panel 120. As a result, the user 240 perceives a single image displayed by both the display panel 220 and the virtual display panel 220*a*, which display the first and second images I1 and I2.

The first and second images I1 and I2 can correspond to two partial images, which is a single image divided into two parts. For example, the single image is divided into two partial images, such as a left partial image and a right partial image. The left partial image is assigned as the first image I1 and the right partial image is assigned as the second image I2. The user 240 perceives the first and second images I1 and I2, and sees them as a single image. In other words, because the first image I1 corresponds to the left partial image and the second image I2 corresponds to the right partial image, the user 240 combines the one partial image being displayed by the display panel 220 and the other partial image reflected from the virtual display panel 220*a*.

As explained above, because the virtual display panel 220*a* has substantially the same width as the display panel 220, the image appears to be about twice as wide as the width of the display panel 220. Accordingly, the user 240 can see an image enlarged by about two times in the horizontal direction. Accordingly, the display device according to the second exemplary embodiment can display an image larger than the display panel by using the display panel, the viewing-zone generator and the reflector.

Figure 7:
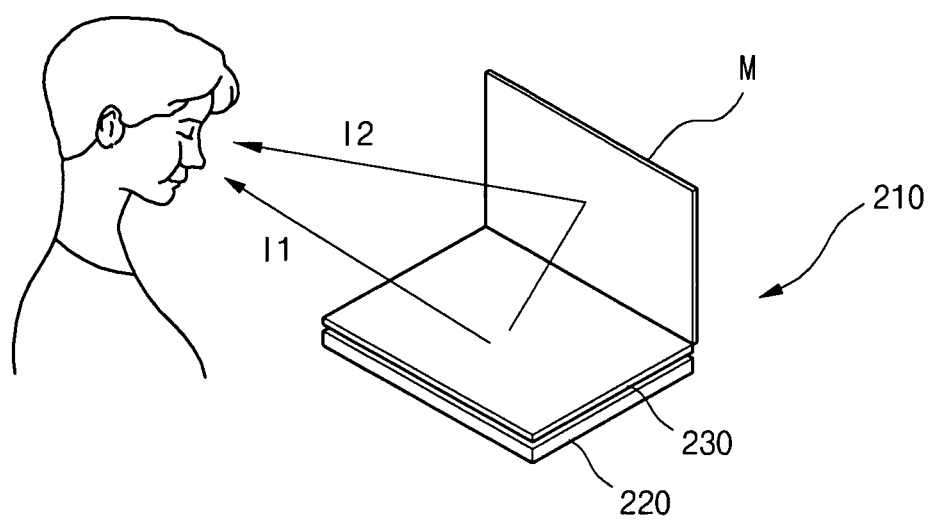
FIG. 7 is a view illustrating an example of using the display device according to the second exemplary embodiment of the invention.

FIG. 7 is a view illustrating an example of using the display device according to the second exemplary embodiment of the invention. Referring to FIG. 7, in a display device 210, a display panel 220 is placed on a horizontal plane, and a reflector M is placed vertically with respect to the display panel 220. Based on the explanations in FIG. 6, because a first viewing zone (VZ1 of FIG. 6) has an off-angle viewing angle with respect to the front of the display panel 220, when a user uses the display device 210 on a desk, the user sees the display panel 220 from a position that is not directly in front of the display panel 220. A single image can be divided into an upper partial image and a lower partial image such that first and second images I1 and I2 correspond to the lower and upper partial images, respectively. First and second pixels alternately arranged in a vertical direction and a viewing-zone generator 230 produce first and second viewing zones in a vertical direction. Accordingly, the user can combine the first image I1 straight from the display panel 220 and the second image I2 reflected from the reflector M, and perceive them as a single image with a display area that is two times bigger than the area of the display panel 220.

Figure 8:
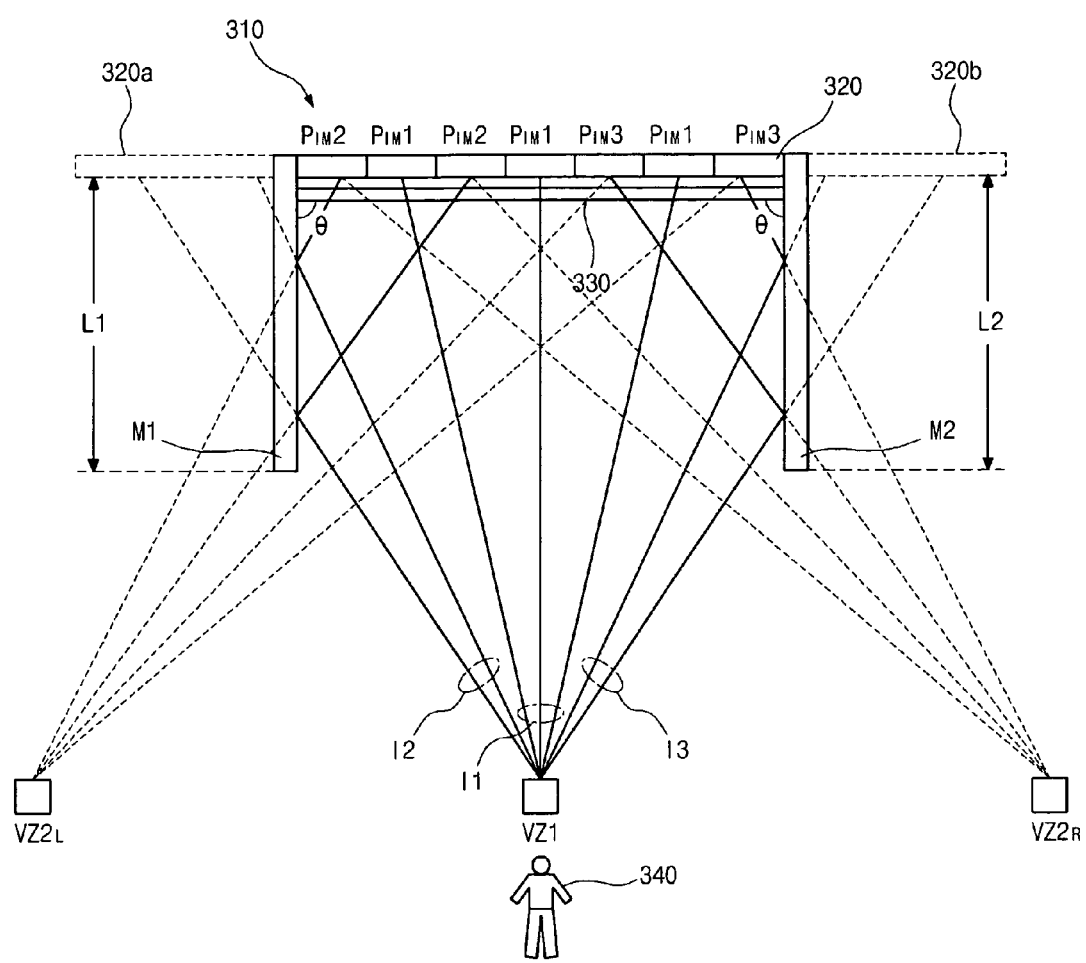
FIG. 8 is a view illustrating operation of a display device according to a third exemplary embodiment of the invention.

FIG. 8 is a view illustrating operation of a display device according to a third exemplary embodiment of the invention. Referring to FIG. 8, the display device 310 includes a display panel 320, a viewing-zone generator 330, and first and second reflectors M1 and M2. The display panel 320 includes first to third pixels PIM1, PIM2 and PIM3 producing first to third images I1, I2 and I3, respectively. The display panel 320 is divided into a first region at the left and a second region at the right, the first and second pixels PIM1 and PIM2 are alternately arranged in the first region, and the first and third pixels PIM1 and PIM3 are alternately arranged in the second region.

The viewing-zone generator 330 is disposed in front of the display panel 320. The viewing-zone generator 330 can include a parallax barrier and a lenticular array. The display panel 320 and the viewing-zone generator 330 produce a first viewing zone VZ1 for the first image I1 and a second viewing zone VZ2 for the second and third images I2 and I3. The first viewing zone VZ1 is produced in front of the display panel 320. The second viewing zone VZ2 includes a left second viewing zone VZ2L at left of the first viewing zone VZ1, and a right second viewing zone VZ2R at right of the first viewing zone VZ1.

The first image I1 produced by the first pixels PIM1, which are arranged throughout the entire display panel 320, is for the first viewing zone VZ1. The second and third images I2 and I3 produced by the second and third pixels PIM2 and PIM3, which are respectively provided in the first and second regions of the display panel 320, are for the left and right second viewing zones VZ2L and VZ2R.

The first and second reflectors M1 and M2 are arranged at both sides of the display panel 320. The first and second reflectors M1 and M2 can have an angle θ with respect to the front surface of the display panel 320. The angle δ is between about 80 and about 100 degrees, such as 90 degrees. The first and second reflectors M1 and M2 are made of a material having a high reflectance, such as a mirror.

Among images produced by the display panel 320, the first image I1 goes straight to the first viewing zone VZ1 without a reflection. The second and third images I2 and I3 do not reach the left and right second viewing zones VZ2L and VZ2R, respectively. Instead, the second and third images I2 and I3 respectively reflect off of the first and second reflectors M1 and M2 so as to be directed toward the first viewing zone VZ1.

The third image I3 goes toward the left second viewing zone VZ2L. However, the third image I3 that goes toward the left second viewing zone VZ2L is not reflected by the first reflector M1. A length L1 of the first reflector M1 is controlled such that the third image I3 does not reflect off of the first reflector M1.

The second image I2 goes toward the right second viewing zone VZ2R. However, the second image I2 that goes toward the right second viewing zone VZ2R is not reflected by the second reflector M2. A length L2 of the second reflector M2 is controlled such that the second image I2 does not reflect off of the second reflector M2.

The user 340 located at the first viewing zone VZ1 can see all of the first to third images I1 to I3. The user 340 perceives the second image I2 reflected from the first reflector M1 produced by a first virtual display panel 320a, which is disposed along a left extension line from the display panel 320. Also, the user 340 perceives the third image I3 reflecting from the second reflector M2 produced by a second virtual display panel 320b, which is disposed along a right extension line from the display panel 320. As a result, the user 340 can see the first virtual display panel 320a, the display panel 320 and the second virtual display panel 320b, which respectively display the first, second and third images I1, I2 and I3. The first and second virtual display panels 320a and 320b each have a width that is substantially half of the width of the display panel 320.

The first to third images I1 to I3 can correspond to three partial images of a single image. For example, the single image can be divided into three partial images, such as a left partial image, a center partial image and a right partial image. The left partial image is assigned as the second image I2, the center partial image is assigned as the first image I1, and the right partial image is assigned as the third image I3. In the third exemplary embodiment, because the first and second virtual display panels 320a and 320b can have a width that is substantially a half of the width of the display panel 320, the single image is not divided equally. The single image is divided into a center partial image that has a width that is half of the width of the single image, and the left and right partial images that have widths that are each a quarter of the width of the single image.

The user 340 sees the first to third images I1 to I3 and perceives them as the displayed single image. In other words, because the second and third images I2 and I3 correspond to the left and right partial images and the first image I1 corresponds to the center partial image, the user 340 perceives a single image being displayed by an extension panel having the display panel 320 and the first and second virtual display panels 320a and 320b. Because the first and second virtual display panels 320a and 320b can each have a width that is substantially a half of the width of the display panel 320, the user 340 can see an image enlarged by two times in a horizontal direction.

Figure 9:
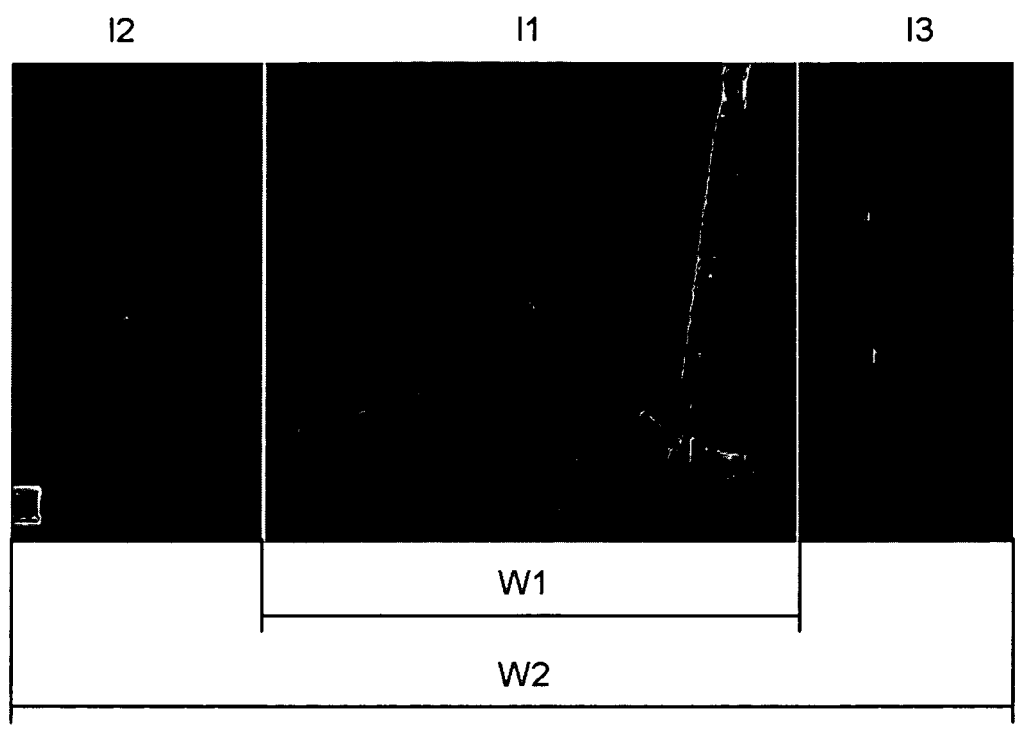
FIG. 9 is a picture displayed in view of a user by the display device according to the third exemplary embodiment.

FIG. 9 is a picture displayed in view of a user by the display device according to the third exemplary embodiment. Referring to FIG. 9, the user sees first to third images I1 to I3 so as to perceive them as a single image. When the display panel (320 of FIG. 8) has a first width W1, the synthesized image has a second width W2, which is substantially twice the first width W1 such that the user sees an image enlarged twofold. Accordingly, the display device according to the third exemplary embodiment can display an image larger than the display panel by using the display panel, the viewing-zone generator and the first and second reflectors.

The display panel as described in the above exemplary embodiments can include a flat display panel, such as, a liquid crystal display (LCD), a field emission display (FED), a plasma display panel (PDP) and a electroluminescent display (EL). When the LCD is used as the display panel, the LCD device is a transmission type having a backlight assembly and a liquid crystal panel, and the parallax barrier is used as the viewing-zone generator. The parallax barrier can be disposed between the LCD device and the user, such as on a front surface of the liquid crystal panel or between the backlight assembly and the liquid crystal panel.

It will be apparent to those skilled in the art that various modifications and variations can be made in the display device and a method of displaying an image of embodiments of the invention without departing from the spirit or scope of the invention. Thus, it is intended that embodiments of the invention cover the modifications and variations of this invention provided they come within the scope of the appended claims and their equivalents.

What is claimed is:

1. A display device comprising:
    a display panel for displaying a plurality of images;
    a viewing-zone generator for producing a plurality of viewing zones corresponding to the plurality of images;
    a first reflector at a first side of the display panel for reflecting a first image of the plurality of images to one of the plurality of viewing zones that corresponds to a second image of the plurality of images; and
    a second reflector disposed at a second side opposite to the first side of the display panel for reflecting a third image of the plurality of images to the one of the plurality of viewing zones that corresponds to the second image,
    wherein the display panel is divided into a first region at left and a second region at right, wherein the first region and the second region are arranged along a horizontal direction from the first side to the second side, and the display panel includes first pixels, second pixels and third pixels for displaying the first image, the second image and the third image, respectively,
    wherein the first pixels and the second pixels are alternately arranged in the first region along the horizontal direction, and the second pixels and the third pixels are alternately arranged in the second region along the horizontal direction, and
    wherein the viewing-zone generator includes a parallax barrier or a lenticular array.

2. The device according to claim 1, wherein the display panel includes one of a liquid crystal display, a field emission display, a plasma display panel and a electroluminescent display.

3. The device according to claim 1, wherein the display panel includes a liquid crystal display having a backlight assembly and a liquid crystal panel and the viewing-zone generator includes a parallax barrier, wherein the parallax barrier is disposed between the backlight assembly and the liquid crystal panel.

4. The device according to claim 1, wherein the first reflector has an angle between about 80 degrees and about 100 degrees with respect to a front surface of the display panel.

5. The device according to claim 1, wherein each of the first and second reflectors has an angle of about 80 degrees to about 100 degrees with respect to a front surface of the display panel.

6. The device according to claim 1, wherein the first, second and third images are first, second and third partial images of a single image, and the plurality of viewing zones are first, second and third viewing zones corresponding to the first, second and third partial images, respectively.

7. The device according to claim 6, wherein the first, second and third partial images are right, center and left partial images of the single image, the first, second and third partial images are seen at the second viewing zone as the single image displayed, and a first width of the single image displayed is about three times bigger than a second width of the display panel.

8. The device according to claim 6, wherein the first, second and third partial images are right, center and left partial images of the single image, a first width of the center partial image is twice as wide as each of second and third widths of the right and left partial images, the first, second and third partial images are seen at the second viewing zone as a displayed single image, and a fourth width of the displayed single image is about two times bigger than a fifth width of the display panel.

9. A method of displaying an image, comprising:
    dividing a single image into a plurality of partial images;
    displaying the plurality of partial images on corresponding sets of pixels arranged alternately throughout a first area of a display panel; and
    reflecting a first partial image of the plurality of partial images by a first reflector to a viewing zone, and a third partial image of the plurality of partial images by a second reflector to the viewing zone, such that a single image is seen by a viewer as having a second area larger than the first area of the display panel,
    wherein the second area is a combination of the first partial image and the third partial image,
    wherein the first reflector and the second reflector are arranged at opposite sides of the display panel on a horizontal direction, and the viewing zone corresponds to a second partial image of the plurality of partial images,
    wherein the display panel is divided into a first region at left and a second region at right,
    wherein the first region and the second region are arranged along the horizontal direction, and the display panel includes first pixels, second pixels and third pixels for displaying the first partial image, the second partial image and the third partial image, respectively,
    wherein the first pixels and the second pixels are alternately arranged in the first region along the horizontal direction, and the second pixels and the third pixels are alternately arranged in the second region along the horizontal direction, and
    wherein a viewing-zone generator for producing a plurality of viewing zones corresponding to the plurality of partial images includes a parallax barrier or a lenticular array.

10. A display device comprising:
    a display panel for displaying a plurality of images on corresponding sets of pixels arranged alternately throughout a first area of the display panel;
    a viewing-zone generator for producing a plurality of viewing zones corresponding to the plurality of images, respectively; and
    a first reflector at a first side of the display panel for reflecting a first image of the plurality of images to one of the plurality of viewing zones which corresponds to a second image of the plurality of images, and a second reflector at a second side opposite to the first side of the display panel for reflecting a third image of the plurality of images to the one of the plurality of viewing zones, such that a single image is seen a viewer as having a second area larger than the first area of the display panel, wherein the second area is a combination of the first image and the third image, wherein the display panel is divided into a first region at left and a second region at right, wherein the first region and the second region are arranged along a horizontal direction from the first side to the second side, and the display panel includes first pixels, second pixels and third pixels for displaying the first image, the second image and the third image, respectively, wherein the first pixels and the second pixels are alternately arranged in the first region along the horizontal direction, and the second pixels and the third pixels are alternately arranged in the second region along the horizontal direction, and wherein the viewing-zone generator includes a parallax barrier or a lenticular array.

11. The device according to claim 10, wherein the display panel includes one of a liquid crystal display, a field emission display, a plasma display panel and a electroluminescent display.

12. The device according to claim 10, wherein the display panel includes a liquid crystal display having a backlight assembly and a liquid crystal panel and the viewing-zone generator includes a parallax barrier, wherein the parallax barrier is disposed between the backlight assembly and the liquid crystal panel.

* * * * *